US006668534B2

(12) United States Patent
Sheedy et al.

(10) Patent No.: US 6,668,534 B2
(45) Date of Patent: Dec. 30, 2003

(54) AUGER FINGERS FOR HARVESTING ASSEMBLIES, AND COMBINES

(75) Inventors: Ronald Leo Sheedy, Eldridge, IA (US); Fredrick Samuel Ward, Moline, IL (US); Keith Thomas Dennehy, Winona, MN (US); Kyle John Tingle, Colona, IL (US)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 09/944,645

(22) Filed: Aug. 31, 2001

(65) Prior Publication Data

US 2003/0041583 A1 Mar. 6, 2003

(51) Int. Cl.[7] .................. A01D 43/02; A01D 89/00
(52) U.S. Cl. ....................... 56/364; 56/12.4; 56/12.5
(58) Field of Search .................. 56/364, 341, 344, 56/351, 350, 358, 432, 12.4, 12.5, 328.1–332, 400; 172/21, 22; 198/613, 722, 693

(56) References Cited

U.S. PATENT DOCUMENTS

| | | | | |
|---|---|---|---|---|
| 3,126,693 A | * | 3/1964 | Renn | 56/364 |
| 3,261,153 A | | 7/1966 | Johnston | |
| 3,402,542 A | | 9/1968 | Johnston | |
| 3,626,678 A | * | 12/1971 | Quam | 56/400 |
| 3,688,482 A | * | 9/1972 | Horn | 56/330 |
| 4,189,907 A | * | 2/1980 | Erdman | 56/400 |
| 4,437,296 A | * | 3/1984 | Erdman | 56/400 |
| 4,915,671 A | * | 4/1990 | Johnson | 460/59 |
| 5,375,402 A | * | 12/1994 | Gidge | 56/130 |
| 5,620,083 A | | 4/1997 | Vogelgesang | 198/722 |
| 5,813,205 A | | 9/1998 | Gosa | 56/364 |
| 5,904,034 A | * | 5/1999 | Youman et al. | 56/328.1 |
| 6,158,571 A | | 12/2000 | Gosa | 198/613 |
| 6,237,778 B1 | * | 5/2001 | Weston | 209/667 |
| 6,244,955 B1 | | 6/2001 | Bischoff et al. | |
| 6,253,535 B1 | * | 7/2001 | Paulson et al. | 172/55 |

FOREIGN PATENT DOCUMENTS

EP  0 236 106  9/1987

OTHER PUBLICATIONS

Texin 245, Online data sheet, Bayer Corporation, Jul. 26, 2001, (2 sheets).
Texin 255, Online data sheet, Bayer Corporation, Jul. 27, 2001, (2 sheets).
Texin 260, Online data sheet, Bayer Corporation, date Jul. 26, 2001 (2 sheets).
Texin 260, Thermoplastic Polyurethane, Bayer Corporation, pp. 1–4. , date Dec. 20, 2000.
Pultex Fiber Reinforced Polymer Rods and Bars, Creative Pultrusions, Inc., (1 sheet). , date 1999 copyright.
Fulcrum Theroplastic Composite Technology, Dow Plastics, date Dec. 2000, (8 sheets).
Gleaner Parts Catalogs, dated Aug. 1993, (2 sheets).
Gleaner Parts Catalogs , dated 1992 , 7 sheets.
Gleaner Parts Catalogs, dated Jan. 2001 , 2 sheets.

* cited by examiner

Primary Examiner—Árpád Fábián Kovács
(74) Attorney, Agent, or Firm—Wilhelm Law Services; Thomas D. Wilhelm

(57) ABSTRACT

Intake fingers and finger assemblies for use with intake portions of harvesting assemblies, on harvesting machines such as combines, haybines, bailers, corn pickers, and the like. The fingers and finger assemblies cooperate with crop-gathering augers, and crankshafts inside the augers, in feeding cut crop material toward discharge portions of such harvesting assemblies. The fingers extend and retract through apertures in the auger cylinder according to an eccentric mounting of the finger crankshaft inside the auger cylinder. A respective finger comprises a reinforced polyester or polyurethane shaft, and a polyurethane sleeve overlying a crop-engaging end portion of the finger, such as along 50% to 80% of the length of the shaft. The shaft is reinforced with fiberglass or other fiber, the composition of the sleeve comprises polyester-based thermoplastic polyurethane, and the sleeve has a hardness of about Shore D-45 to about Shore D-70.

29 Claims, 3 Drawing Sheets

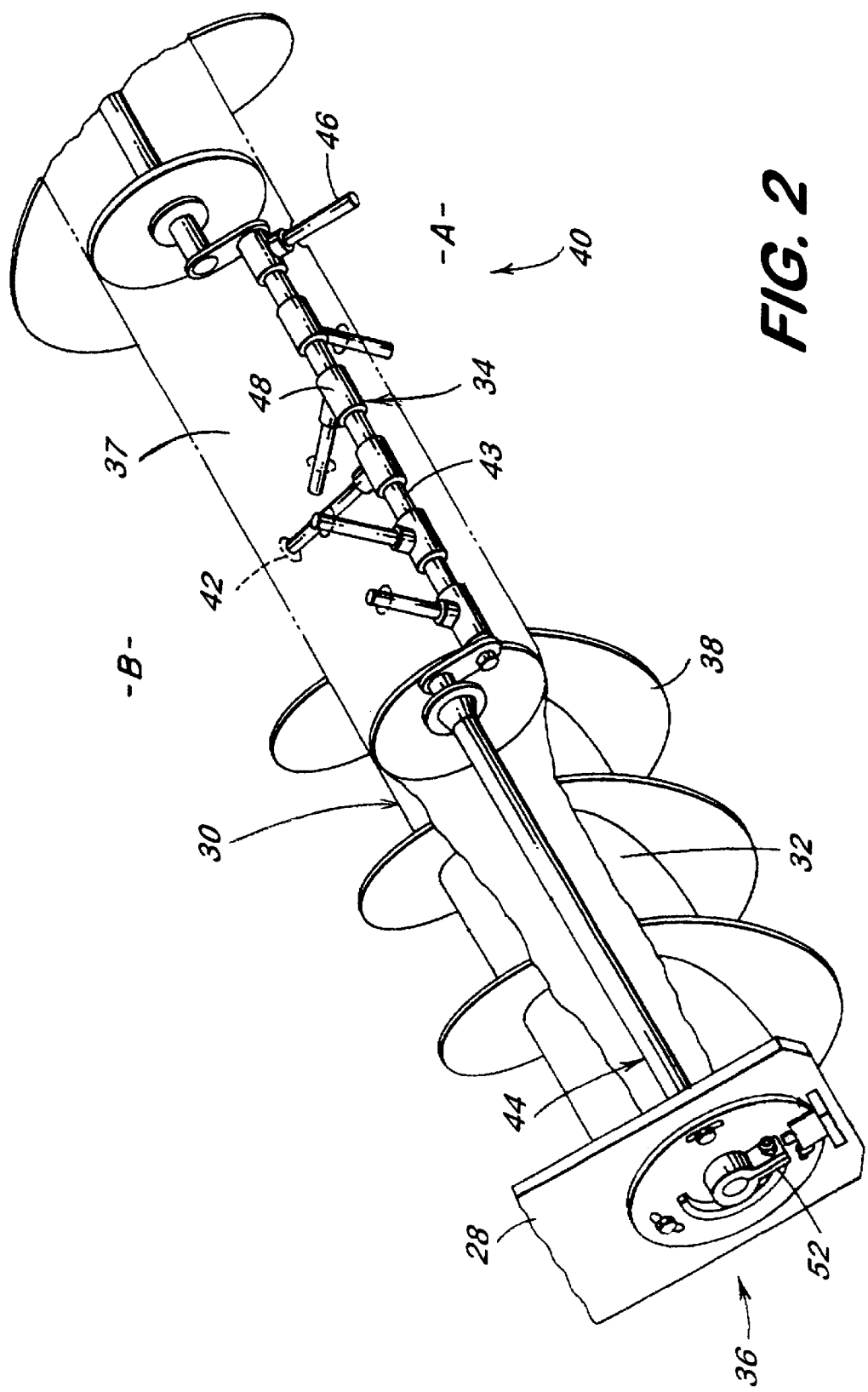

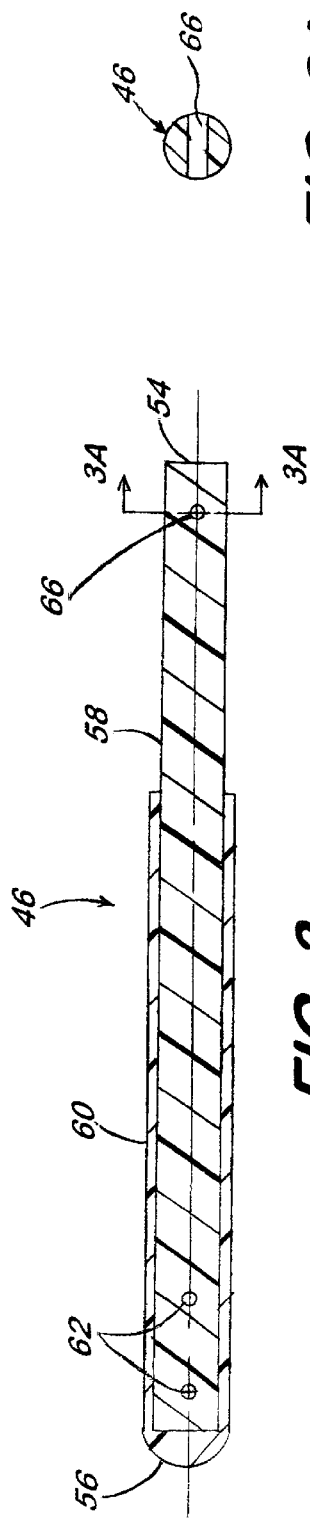
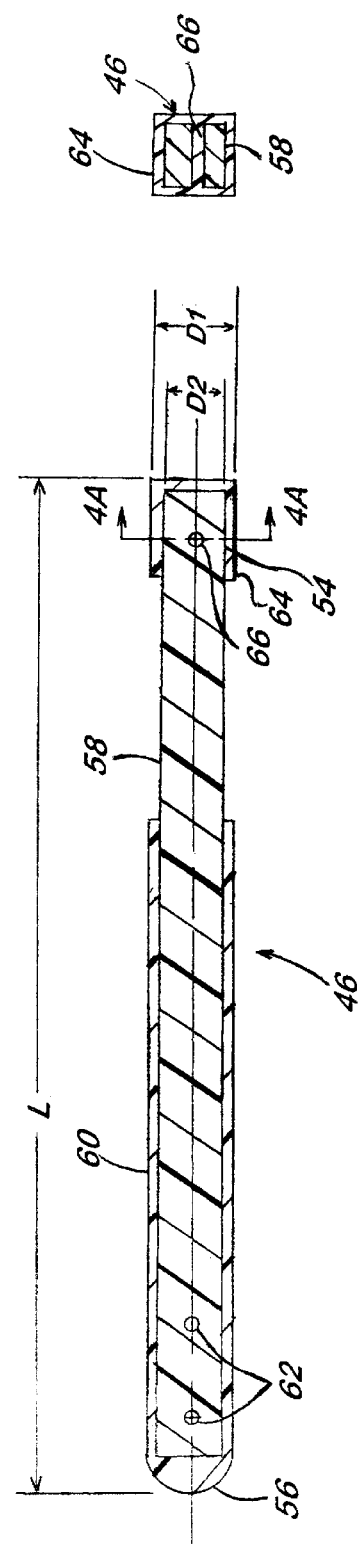

AUGER FINGERS FOR HARVESTING ASSEMBLIES, AND COMBINES

BACKGROUND

This invention relates to harvesting machines, to harvesting machine assemblies, and in particular to retractable fingers in rotary augers in harvesting machine assemblies.

In harvester assemblies, it is common for the assembly to include a tubular crop converging auger which assists in transfer of crop material from the harvesting assembly into a feeder conveyor. Such crop converging auger commonly includes opposing spiral flights to assist such auger in moving the crop material from the ends of the harvesting assembly to the center of the harvesting assembly where the crop material is fed into the feeder conveyor. The central portion of the auger, forward of and in the vicinity of the feeder conveyor, is provided with a rotating finger assembly of extending and retracting fingers. In the finger assembly, a finger crank shaft is mounted inside the tube of the tubular auger, eccentric to the rotating auger tube, and is generally restrained against continuous rotation of such finger crank shaft.

Elongate intake fingers are journalled on the finger crank shaft for generally free rotation with respect to the generally fixedly-mounted crank shaft, whereby the fingers can freely rotate about the crank shaft while the crank shaft, itself, is not rotating. The intake fingers extend generally radially outwardly from the finger crank shaft, and generally outwardly of the auger, and generally extend radially outwardly of the auger tube through guide holes or slots in the side wall of the auger tube, or through guide bearings mounted to such holes or slots in the side wall of the auger tube. As the tube rotates, the rotational movement of the auger exerts force against the sides of the fingers, whereby the fingers are caused to rotate about the finger crank shaft. Since the finger crank shaft is eccentric with respect to the longitudinal axis of the auger tube, as the fingers rotate about the finger crank shaft, as forced by the side walls of the auger tube, the fingers appear to repeatedly move outwardly and inwardly of the auger as the auger rotates about its longitudinal axis. The finger crank shaft is so positioned within the auger that the intake fingers extend from the auger to engage crop material as the respective fingers are located toward the front of the assembly and moving downwardly to engage crop material, and retract inwardly of the auger as the fingers move upwardly and forward across the top of the auger. Such positioning of the finger crank shaft thus times extension and retraction of the intake fingers such that the intake fingers extend to engage and take in crop material which is on the assembly floor, and sweep such crop material under the auger, taking such crop material into the feeder conveyor which is behind the auger. As the fingers rise on the rear of the auger, the retraction of the intake fingers into the auger assist in releasing the crop material from the fingers and taking the crop material into the feeder conveyor.

A harvesting assembly must operate in a variety of soil and crop conditions. Such assembly is commonly positioned by the operator so as to be as close to the ground surface as possible, in order to harvest as much of the harvestable crop as possible. Further, a harvesting assembly is often operated at or near maximum capacity so as to gain as much production as possible during the harvest season, and while the crop is at peak value. With such a high incentive for the operator to operate the harvester at or near capacity, the harvester, including the conveying elements, and including the auger and fingers, are subjected to heavy and fluctuating loads. Because the harvesting assembly is often operated close to the surface of the ground, the platform commonly picks up extraneous, non-crop items from the soil, for example rocks, clods of dirt, scrap metal, and like detritus. Such extraneous material periodically finds its way to the central portion of the platform where the auger fingers may engage such extraneous field detritus.

While the fingers are engineered to process and handle the stresses imposed by the crop materials, including high levels of loading of the crop materials, the fingers are susceptible to being damaged or broken by the in advertent picking up and feeding of such extraneous detritus, particularly rock, from the surface of the soil. Such broken fingers may pass through the harvester and thereby damage the components of the harvester. In addition, the fingers are subject to regular abrasion from the dirt gathered in with the crop, as well as from the crop materials, themselves.

There is thus a relatively frequent need to remove and reinstall worn-out platform auger fingers, and to replace damaged or broken auger fingers.

It is an object of the invention to provide improved auger fingers which are less susceptible of being damaged.

It is another object of the invention to provide auger fingers which are less prone to separation of pieces from damaged or broken fingers.

It is yet another object of the invention to provide fingers which, when broken pieces do separate from the fingers, can pass through the harvester with less damage to other harvester components, or no damage to the other harvester components.

It is yet a further object to provide harvesting assemblies which incorporate therein improved auger fingers which are less susceptible of failure, and which do less or no damage to other harvester components when such fingers do fail.

SUMMARY

An intake finger for use in a harvesting machine comprises a central longitudinal shaft made with polyester or polyurethane, and a sleeve overlying the central shaft and extending from a distal end of the shaft toward a proximal, mounting end of the shaft. The central longitudinal shaft is preferably fiber reinforced, to provide overall strength to the intake finger. The composition of the sleeve is selected for good abrasion resistance, and is generally selected from thermoplastic polyurethanes.

In a first family of embodiments, the invention comprehends an elongate intake finger for use with an intake portion of a harvesting assembly on a harvesting machine such as a combine, a haybine, a bailer, a corn picker, or the like. The intake finger has a length, and comprises a central longitudinal reinforced polymeric shaft, having an outer surface. The shaft has a proximal end and a distal end. The composition of the shaft comprises polymer selected from the group consisting of thermoset polyesters and thermoplastic polyurethanes. The finger also includes a sleeve made of sleeve material polymer, overlying the shaft, and extending, from a locus at or proximate the distal end of the shaft, along the length of the shaft, toward the proximal end of the shaft. The composition of the sleeve comprises a thermoplastic polyurethane composition.

In preferred embodiments, the composition of the sleeve comprises polyester-based thermoplastic polyurethane.

In preferred embodiments, the sleeve has a hardness of about Shore D-45 to about Shore D-70.

A preferred sleeve has an abrasion wear life, in crop harvesting use, of at least 200 hours.

A preferred embodiment of the finger includes a mounting aperture extending transversely into the shaft under the sleeve, the mounting aperture containing sleeve material which assists in mounting the sleeve to the shaft.

In preferred embodiments, the sleeve extends along about 50 percent to about 80 percent of the length of the shaft.

Further to preferred embodiments, the sleeve can be a first color readily distinguishable from a second color of the shaft whereby a user can readily distinguish by color when the sleeve is worn away to the extent that the finger should be replaced.

Some embodiments of the finger include a cap on the proximal end of the finger, the cap defining a first cross-section of the shaft plus the cap, along the length of the shaft, different from a second cross-section of the shaft displaced from the cap.

In highly preferred embodiments, the shaft comprises fiberglass-reinforced thermoset polyester and the sleeve comprises aromatic polyester-based thermoplastic polyurethane.

In a second family of embodiments, the invention contemplates a harvesting assembly, for use on a harvester. The harvesting assembly comprises a support structure; crop detachment apparatus such as a reciprocating cutter or corn ear plucking apparatus. The harvesting assembly further comprises an auger comprising a generally hollow cylinder having first and second ends, and a length between the first and second ends. Opposite hand flights extend from adjacent the first and second ends, at an outer surface of the cylinder, for conveying crop material toward a central section of the auger. The cylinder has apertures therein, extending to an interior cavity disposed inwardly of the cylinder. The harvesting assembly further comprises an intake finger assembly. The intake finger assembly comprises a plurality of fingers, and bearings mounting the fingers to a finger crankshaft in the cavity, for rotation of the fingers about the crankshaft. The finger assembly, including the crankshaft, cooperates with the cylinder to extend and retract the fingers through the apertures as the auger rotates about a central longitudinal axis. The fingers comprise reinforced polymeric shafts. The compositions of the shafts are selected from the group consisting of thermoset polyesters and thermoplastic polyurethanes. The fingers further comprise sleeves, made of sleeve material polymer. The sleeves overlie the shafts, and extend from loci at or proximate distal ends of the fingers remote from the crankshaft, toward the crankshaft, the sleeves comprising thermoplastic polyurethane compositions.

BRIEF DESCRIPTION OF THE DRAWINGS

FIG. 2 shows a perspective view of a rotary conveying auger having a finger assembly contained inside a tubular drum; and wherein the fingers rotate about an eccentrically mounted finger crank shaft as the auger rotates about the longitudinal axis of the auger drum.

FIG. 3 shows a representative longitudinal cross-section of a first embodiment of intake fingers of this invention.

FIG. 3A shows a cross-section of the finger of FIG. 3 taken at 3A—3A of FIG. 3.

FIG. 4 shows a representative longitudinal cross-section of a second embodiment of intake fingers of this invention.

FIG. 4A shows a cross-section of the finger of FIG. 4 taken at 4A—4A of FIG. 4.

Figure 1:
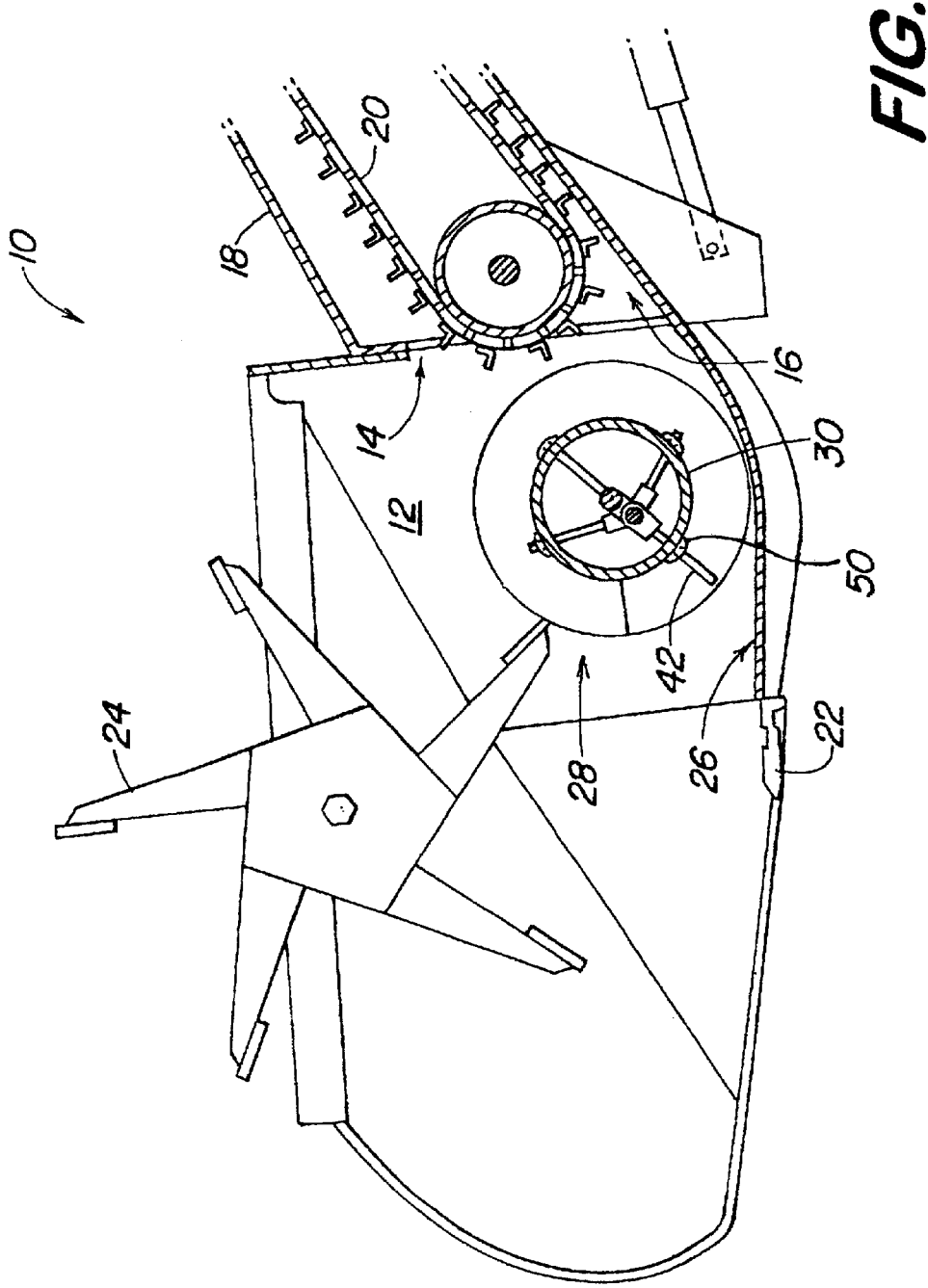
FIG. 1 shows a cross-sectional side view of a harvesting assembly.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring to FIG. 1, harvesting assembly 10 is provided with a support structure 12 having an outlet 14. The outlet 14 corresponds to the inlet 16 of the feederhouse 18. The feederhouse 18 is provided with a conveyor 20 for directing the cut crop to the combine. The forward edge of the support structure 12 is provided with a cutter 22. In the illustrated platform, the cutter is a relatively conventional reciprocating cutter bar. As the platform is moved through the field, the top portions of the crop plants are engaged by a rotating reel 24. The stalks are cut by the cutter 22 and the cut crop falls on the floor 26 of the support structure. A transversely extending rotary auger 30 draws the cut crop on the floor 26 toward the center of the platform where the cut crop is propelled through outlet 14 into feederhouse 18.

Referring now to FIGS. 1 and 2, FIG. 2 shows one of a pair of transversely spaced side walls 28 of rotary auger 30. Such rotary auger is used to gather together crop material which has fallen onto the platform floor, and to deliver such crop material to feederhouse conveyor 20. Rotary augers such as auger 30 can be found in e.g. cutter heads, corn choppers, corn pickers, pick-ups, and the like.

Specifically, rotary auger 30 includes a cylindrical housing or drum 32 defined by a tubularly-shaped layer of sheet metal, and a generally enclosed cavity 37, an intake finger assembly 34 inside cavity 37, and a finger control mechanism 36 generally disposed at side wall 28.

Drum 32 is typically formed from tubularly-formed sheet metal and typically has a diameter of about 200 mm to about 400 mm. Opposite ends of drum 32 are rotatably supported on bearings (not shown) carried by side walls 28. Helical vanes or flights 38 of opposite hand, are secured to the outer circumferential surface of drum 32 and extend inwardly along the outer surface of drum 32 from opposite ends thereof so as to convey the cut crop materials toward the center of drum 32 during rotation of the drum.

A central region 40 of drum 32 between vanes 38 contains the intake finger assembly and is provided with a plurality of openings 42 through the sheet metal. During operation, drum 32 is brought into rotation by drive components, not shown, such as gears and chains. Intake finger assembly 34 includes a crankshaft 44 and a plurality of intake fingers 46 journalled on the crank shaft. Opposite ends of the crank shaft extend along and are supported, preferably for rotation, about the axis of drum 32. Crankshaft 44 is supported, free to rotate, by at least one bearing, not shown, at side wall 28.

A central section 43 of crankshaft 44 is located within central region 40 of drum 32, and is offset from the axis of the remainder of the crankshaft so as to be eccentric to the central longitudinal axis of rotation of drum 32. Inner ends of fingers 46 are mounted by bearings 48, for rotating freely about crankshaft central section 43. Fingers 46 extend through respective ones of openings 42 of drum 32, the openings being located at staggered locations along central section 43 of drum 32 so that the fingers have portions of different lengths extending from drum 32 at different loci about the circumference of drum 32.

Openings 42 are preferably provided with finger guides 50, as illustrated in FIG. 1, to slidably support and guide the fingers between interior and exterior surfaces of the drum. Suitable such guides are preferably fabricated from metal, or from certain ones of the performance plastics.

In the illustrated embodiment, rotary auger 30 is configured as an undershot auger, whereby intake fingers 46 extend to the greatest extent from drum 32 in a forward upstream section -A- (FIG. 2) and extend to the least extent from drum 32 in a rear, downstream section -B- which leads to feederhouse 18.

A retainer 52 selectively fixes crankshaft 44 against completely free rotation, and hence generally fixes the eccentric central section in place so that fingers 46 operate in a desired manner during rotation of drum 32.

As can be seen from FIGS. 1 and 2, fingers 46 are structured and emplaced, with respect to auger drum 32, to engage whatever material is presented to floor 26 of the platform by the flights 38 of auger 30. Accordingly, a finger may be susceptible to breakage to the extent the finger encounters a hard or immovable object, such as a rock on the floor of the platform. To the extent pieces break off the fingers, to the extent a piece of a broken finger proceeds into the feederhouse and thence through the harvester, depending on the size of the broken piece, and the material of which the broken piece is composed, such broken finger piece, e.g. a metal finger, can potentially cause substantial damage to various components and elements of the harvester.

Accordingly, this invention provides polymer-based finger structures which have acceptable use lives, and wherein, when such fingers do break or otherwise fail, little if any material of such fingers is ingested into the harvester. In addition, when broken pieces of such fingers are ingested into the harvester, passage of such broken pieces through the harvester causes no damage or a reduced amount of damage compared to passage of broken metal finger pieces through the harvester.

Fingers 46 must be sufficiently strong, tough and durable to resist breakage when encountering obstacles and other detritus as the fingers sweep crop material from the floor of the platform into the feederhouse. Fingers 46 must be sufficiently abrasion resistant, in rubbing and pushing contact with crop materials from floor 26, as well as with respect to detritus, rocks, dirt, sand, gravel, scrap metal, and the like which are ingested into, onto platform 10, to provide suitable use life before the fingers need to be replaced because of abrasive wear. The fingers should wear for an average of at least about 200 hours of in-field use of the harvester before abrading to the point where the fingers need replacement based on abrasive wear. Preferred wear life is at least 300 hours.

Further, the materials selected for use in fingers 46 must be such that, when a finger breaks, the broken pieces can pass into feederhouse 18, and thence through the harvester, without doing significant damage to the harvester.

Referring now to FIGS. 3 and 3A, a finger 46 of the invention has an overall length "L," an overall outer diameter "D1," a minor diameter "D2," a proximal mounting end 54, and a distal crop-material engaging end 56. The structure of finger 46 includes a central shaft 58, and an outer sleeve 60. Central shaft 58 provides the major portion of the physical strength which provides toughness of the finger against breakage. The material of sleeve 60 is selected for its ability provide a surface suitably resistant to abrasion by such materials as are encountered by the fingers in the harvesting assembly. In addition, the sleeve should be compatible with wearing against finger guide 50 or drum 32.

Thus, the finger routinely sustains wear both at the surface of the crop material being harvested, and at the interface between the finger and respective guide 50 or drum 32. To that end, sleeve 60 extends from the distal end of the finger along the length of the finger at least to that point along the length of the shaft where finger 46 interfaces with guide 50 or drum 32 when the finger is extended to the greatest extent of finger extension.

A typical such finger 46 has an overall diameter D1 of about 18 mm to about 23 mm, with preferred overall diameter of about 20 mm to about 21 mm. The minor diameter "D2" of shaft 58 is typically about 11 mm to about 18 mm., with preferred diameter of about 13 mm to about 16 mm. While both the cross-section of the shaft and the overall cross-section of the finger have been illustrated as circular, either or both such cross-sections can be other shapes as desired, with corresponding adjustments being made in those other elements of the harvesting assembly which interface with the fingers. Thus, there can be mentioned, oval, rectangular, square, and other polygonal and curvilinear shapes for shaft 58.

The composition of shaft 58 must be tough, hard, and resistant to breakage or other failure under field use conditions. To the extent shaft 58 does fail, such failure should proceed in such manner as to limit the probability that pieces of the broken finger become separated from the finger so as to be ingested into the feederhouse along with the crop material being processed.

The composition and surface structure of shaft 58 must be amenable to bonding with the material of sleeve 60. To that end, and referring to FIGS. 3 and 3A, two apertures 62 extend entirely through shaft 58. Apertures 62, in the alternative, can be blind apertures which extend into but not all the way through shaft 58. However, preferred apertures 62 extend all the way through shaft 58. Preferred apertures define openings corresponding to about 3 mm to about 6 mm diameter at the outer surface of the shaft. The cross-section of a given aperture may or may not extend entirely through shaft 58. To the extent the shaft extends entirely through the shaft, the cross-section may or may not be round at some or all distances of penetration into the shaft, and the cross-section may vary along the length of the aperture.

Apertures 62 are generally filled with material of sleeve 60 when sleeve 60 is molded about shaft 58, whereby the apertures, and the sleeve material in the apertures, assist in holding the sleeve material on shaft 58.

Suitable materials for use as shaft 58 are pultrusions having compositions of thermoset polyester, reinforced with fiberglass fibers. Rods of such pultrusions are available from Creative Pultrusions, Inc. Alum Bank, Pa. as PULTEX® Fiber Reinforced Polymer Rods. Suitable such rods have diameters of about 16 mm, and are cut to length as needed to provide fingers of typical length "L" of about 265 mm to about 285 mm after application of sleeve 60.

Alternate material which may be suitably fabricated, reinforced with fiberglass, to make a finger shaft 58 are engineering thermoplastic polyurethanes available from the Dow Chemical Company, Midland, Mich., as FULCRUM®.

Typical compositions used for shaft material are reinforced with fibers such as fiberglass fibers. In typical such compositions, the fibers comprise about 25 percent to about 70 percent preferably about 45 percent to about 65 percent, by volume of the respective composition. Table 1 following illustrates typical properties of the above-noted shaft materials.

TABLE 1

| Test | ASTM | Units | Value Pultex ® | Value Fulcrum ® |
|---|---|---|---|---|
| Flex Strength | D790 | psi | 100,000 | 157,000 |
| Flex Modulus | D790 | $10^6$ psi | 6.0 | 5.08 |
| Notched Izod | D256 | ft-lb/in | 40 | — |

Sleeve 60 extends along and about the length of shaft 58, typically covering the shaft along about 60% to about 80% of the length of the shaft, in order to provide sleeve coverage of the shaft along the full length of the finger which will interact directly with the crop material, and along the full length of the finger which will interact with a guide 50 or an aperture 42. While sleeve 60 can extend along the full length of the shaft, such full-length extension is not preferred. Similarly, the sleeve can extend along less than 60% of the length of the shaft, but then a substantial portion of the length of the shaft is unavailable for crop material engagement or for guide engagement through the sleeve, whereby a sleeve covering less than 50% of the length of the finger is not preferred.

Sleeve 60 must be sufficiently hard to resist being pulled from shaft 58 by abrading crop material, or detritus in the material traversing harvesting assembly 10. Hardness of Shore D45 to Shore D70 is preferred. More preferred is Shore hardness of about D55 to about D60.

The sleeve material must also be sufficiently abrasion resistant, with respect to the materials which are normally picked up and dropped on the floor of platform 10, to withstand abrasion typically encountered under field use conditions on interaction with such ingested materials. Abrasion resistance of no more than 70 mg Taber Abrasion, ASTM D3489, is acceptable, with Taber Abrasion of about 50 mg or less being more preferred.

Suitable materials for use as sleeve 60 are certain aromatic polyester-based thermoplastic polyurethanes, having the necessary hardness and abrasion resistance. Exemplary of such polyester-based thermoplastic polyurethanes are respective ones of the Texin® family of resins available from Bayer Plastics, Pittsburgh, Pa. Preferred such resins are Texin® 255 and Texin® 260. Texin® 255 has a Shore Hardness of D-55. Texin 260® has a Shore Hardness of D-60. Both Texin® 255 and Texin® 260 have Taber Abrasion results of 50 mg loss.

In preferred fingers 46, shaft 58 typically withstands the structural forces of impact, bending and the like longer than the sleeve material withstands the abrasion of the material transiting the floor of assembly 10. Thus, one balances the thickness of shaft 58, and the strength attending such thickness, against the thickness of sleeve 60, and the abrasion wear time attending such sleeve thickness. In general, average thickness of sleeve 60, between interface of the sleeve with shaft 58, and the outside overall diameter "D1," is about 1.5 mm to about 6 mm. Within the above-cited range, thickness of the sleeve will, of course, depend on the strength of the material used in making shaft 58, as well as the abrasion properties of sleeve 60. Thicknesses outside the above recited range are possible where suitable cost effective materials are available to provide the above noted balance of physical strength of the shaft and abrasion tolerance of the sleeve material.

FIGS. 4 and 4A illustrate a second embodiment of structure for finger 46. As seen in FIGS. 4 and 4A, a second segment of sleeve material surrounds the proximal end of the finger as a mounting cap 64. Cap 64 is designed and configured to cooperatively interact with the structures of finger bearings 48, for ease of mounting the finger to a respective one of the finger bearings. While cap 64 is shown as being generally rectangular, the cap can be any desired configuration compatible with being molded to shaft 58 in combination with compatibility with reliably and easily mounting the finger to a bearing 48.

As with the working end of shaft 58, a mounting aperture 66 is disposed at the proximal end of the shaft. The above discussion of structure and configuration of apertures 62 applies to aperture 66, as aperture 66 is used to assist with mounting and securing cap 64 to the proximal end of the shaft.

Sleeve 60 can be fabricated to shaft 58 by placing shaft in a suitable injection mold, having suitable dimensions to leave a space for the sleeve material to flow about the shaft along the respective length of the shaft, and injection molding the sleeve material onto the shaft. As the sleeve material flows about the shaft, the sleeve material also flows into and through any apertures 62, thus to fill or partially fill the apertures with the sleeve material. Such extension of the sleeve material into the apertures mechanically locks the sleeve material to the shaft, in addition to whatever adhesive and mechanical friction is established between shaft 58 and the sleeve material as the sleeve material cools and solidifies.

In order to tolerate the anticipated working environment, including abrasion and impact events, fingers 46 should tolerate static bending torque of at least 2500 Newton-Meters, preferably 4000 Newton-Meters. Such bending torque is tested as follows. In a Tinius Olsen Tensile Tester, shaft 58 is supported from above, and preferably also from below, at aperture 66. The finger is supported by an underlying fulcrum at a distance of about 95 mm from aperture 66. A load is applied downwardly on the finger at about 12 mm from the distal end of the finger. The load is gradually increased by gradually moving the load element downwardly and recording the load resistance exerted by the finger. The end of the test is established when significant failure occurs, resulting in significant reduction in the recorded load.

Using such test, metal fingers generally break off completely from the held stub at the proximal end of the finger without substantial deflection prior to breakage. Fingers of the invention evidence substantial deflection before breakage, and generally break, fail without complete separation of finger elements from the supported stub or with only limited material separation. Rather, fingers of the invention tend to bend, with eventual failure of the finger or shaft material along the length of the finger. Where sufficiently long reinforcing fibers are used, the bent and/or failed portion of the finger does not separate from the supported stub. Such failures typically reveal the fibrous inclusions therein, which fibrous inclusions typically prevent separation of the distal end of the finger from the proximal end of the finger under such test.

Fingers disclosed herein, using e.g. Texin® polyurethane sleeve material over e.g. Pultex® shafts have average use life of greater than 300 hours, e.g. about 300 hours to about 400 hours, of field use in harvesting typical e.g. small grain and corn crops. When such fingers break, typically no damage is done to the rest of the harvester, whereby repair is limited to replacement of fingers and, optionally, finger guides 50 and/or finger bearings 48.

While fiberglass reinforcing fibers have been illustrated, other fibers can well be used where such fibers provide the desired level of strength and resistance to separation of the distal end of the finger from the proximal end of the fiber. There can be mentioned, for example and without limitation, various of the metal fibers and ceramic fibers, as well as carbon fibers.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. An elongate intake finger (46) for use with an intake portion of a harvesting assembly, said intake finger (46) having a length, and a finger outer surface, and comprising:
   (a) an inner longitudinal reinforced polymeric shaft, said inner shaft (58) having a proximal end (54) to be mounted to such harvesting assembly, and a distal end (56) to extend away from such harvesting assembly, and to engage crop material, and an inner shaft outer surface, the composition of said inner shaft comprising polymer selected from the group consisting of thermoset polyesters and thermoplastic polyurethanes, and an effective amount of reinforcing fiber inclusions therein sufficient to provide at least incremental additional resistance to separation of a broken piece of said intake finger from a remainder portion of said intake finger; and
   (b) an outer sleeve (60) made of sleeve material polymer, overlying and secured to the outer surface of said inner shaft (58), and extending, from a locus at or proximate the distal end (56) of said inner shaft (58), along the length of said inner shaft (58), said outer sleeve (60) comprising a thermoplastic polyurethane composition;
whereby said fiber-reinforced inner shaft (58), and said outer sleeve (60), in combination, define said elongate intake finger (46).

2. An elongate intake finger as in claim 1 wherein the composition of said sleeve (60) comprises polyester-based thermoplastic polyurethane.

3. An elongate intake finger as in claim 1 wherein said sleeve (60) has a hardness of about Shore D-45 to about Shore D-70.

4. An elongate intake finger as in claim 1 wherein said sleeve (60) has an average abrasion wear life, in crop harvesting use, of at least 200 hours.

5. An elongate intake finger as in claim 1, including a sleeve-mounting aperture (62) proximate the distal end (56) of said intake finger (46), said sleeve-mounting aperture (62) extending transversely into said inner shaft (58) of said intake finger (46), inwardly of said sleeve (60), and sleeve material extending from said sleeve (60) into the aperture (62), whereby sleeve material in the aperture (62) assists in locking said outer sleeve (60) to said inner shaft (58).

6. An elongate intake finger as in claim 1, said sleeve extending along about 50 percent to about 80 percent of the length of said shaft (58).

7. An elongate intake finger as in claim 1 wherein said sleeve (60) is a first color readily distinguishable from a second color of said shaft (58), whereby a user of said intake finger can readily distinguish by color when said sleeve (60) is worn away to the extent that said finger should be replaced.

8. An elongate intake finger as in claim 1, and including a cap (64) on the proximal end (54) of said finger (46), said cap (64) defining a first cross-section of said shaft (58) plus said cap (64), along the length of said shaft (58), different from a second cross-section of said shaft (58) at a location displaced from said cap (64).

9. An elongate intake finger as in claim 1 wherein said shaft (58) comprises fiberglass-reinforced thermoset polyester and said sleeve (60) comprises aromatic polyester-based thermoplastic polyurethane.

10. An elongate intake finger as in claim 5 wherein said sleeve-mounting aperture (62) is filled with material of said sleeve (60).

11. An elongate intake finger as in claim 1, said inner shaft (58) being reinforced with fiberglass fibers.

12. An elongate intake finger as in claim 1, said inner shaft (58) being reinforced with reinforcing fiber in an amount of about 25 percent by volume to about 70 percent by volume.

13. An elongate intake finger as in claim 1, said inner shaft (58) being reinforced with reinforcing fiber in an amount of about 45 percent by volume to about 65 percent by volume.

14. An elongate intake finger as in claim 1, said outer sleeve (60) defining an average thickness of sleeve material between the outer surface of said inner shaft (58) and the outer surface of said intake finger (46) of about 1.5 millimeters to about 6 millimeters.

15. A harvesting assembly, for use on a harvester, said harvesting assembly comprising:
   (a) a support structure;
   (b) crop material detachment apparatus;
   (c) an auger (30) comprising a generally hollow cylinder (32) having first and second ends, and flights, extending from adjacent the first and second ends, at an outer surface of said cylinder (32), for conveying crop material toward a central section of said auger (30), said cylinder (32) having apertures (42) therein, extending to an interior cavity (37) disposed inwardly of said cylinder (32); and
   (d) an intake finger assembly in the cavity (37), said intake finger assembly comprising a plurality of elongate intake fingers (46) having finger outer surfaces, a finger crankshaft (44), and finger bearings (48) mounting said fingers to said crankshaft (44) for rotation of said fingers (46) about said crankshaft (44), said finger assembly, including said crankshaft (44), cooperating with said auger cylinder to extend and retract said fingers (46) through the apertures (42) as said auger (30) rotates about a central longitudinal axis,
      said fingers (46) comprising fiber reinforced polymeric inner shafts (58) having proximal (54) and distal (56) ends, and shaft outer surfaces, and wherein the polymeric compositions of said inner shafts (58) are selected from the group consisting of thermoset polyesters and thermoplastic polyurethanes, and wherein said inner shafts (58) are reinforced by an effective amount of reinforcing fiber inclusions sufficient to provide at least incremental additional resistance to separation of broken pieces of said intake fingers (46) from remainder portions of said intake fingers (46), said intake fingers further comprising outer sleeves (60), made of sleeve material polymer, and overlying and secured to the outer surfaces of said inner shafts (58), and extending from loci at or proximate distal ends (56) of said fiber-reinforced polymeric inner shafts (58) remote from said crankshaft (44), toward said crankshaft (44), said outer sleeves (60) comprising thermoplastic polyurethane compositions, whereby said fiber-reinforced inner shafts (58), and said outer sleeves (60), in combination, define said elongate intake fingers (46).

16. A harvesting assembly as in claim 15 wherein the compositions of said sleeves (60) comprise polyester-based thermoplastic polyurethanes.

17. A harvesting assembly as in claim 15 wherein said sleeves (60) have hardnesses of about Shore D-45 to about Shore D-70.

18. A harvesting assembly as in claim 15 wherein said sleeves (60) have average abrasion wear lives, in crop harvesting use, of at least 200 hours.

19. A harvesting assembly as in claim 15 wherein said fingers (46) comprise sleeve-mounting apertures (62) proximate the distal ends (56) of the intake fingers (46), said sleeve-mounting apertures (62) extending transversely into said inner shafts (58) of said intake fingers (46), inwardly of said outer sleeves (60), the sleeve material in respective said fingers (46) extending from the respective said sleeves (60) into the sleeve-mounting apertures (62), whereby sleeve material in the apertures (62) assists in mounting said outer sleeves (60) to said inner shafts (58).

20. A harvesting assembly as in claim 15, said sleeves (60) extending along about 50 percent to about 80 percent of the lengths of said shafts (58).

21. A harvesting assembly as in claim 15 wherein each said sleeve (60) is a first color readily distinguishable from a second color of the respective said shaft (58) of the respective said finger, whereby a user thereof can readily distinguish by color when the respective said sleeve (60) is worn away to the extent that said finger (46) should be replaced.

22. A harvesting assembly as in claim 15, and including caps (64) on proximal ends (54) of said fingers (46), each said cap (64) defining a first cross-section of the respective said shaft plus said cap, along the length of the respective said shaft (58), different from a second cross-section of the respective said shaft (58) at a location displaced from the respective said cap (64).

23. A harvesting assembly as in claim 15 wherein said shafts (58) comprise fiberglass-reinforced thermoset polyester and said sleeves (60) comprise aromatic polyester-based thermoplastic polyurethane.

24. A harvesting assembly as in claim 19 wherein said sleeve-mounting aperture (62) is filled with material of said sleeve (60).

25. A harvesting assembly as in claim 15, said inner shaft (58) being reinforced with fiberglass fibers.

26. A harvesting assembly as in claim 15, said inner shaft (58) being reinforced with reinforcing fiber in an amount of about 25 percent by volume to about 70 percent by volume.

27. A harvesting assembly as in claim 15, said inner shaft (58) being reinforced with reinforcing fiber in an amount of about 45 percent by volume to about 65 percent by volume.

28. A harvesting assembly as in claim 15, said outer sleeves (60) defining average thicknesses of sleeve material between the outer surfaces of said inner shafts (58) and the outer surfaces of said intake fingers (46) of about 1.5 millimeters to about 6 millimeters.

29. A harvesting assembly as in claim 15 wherein all intake fingers (46) in the intake finger assembly comprise said reinforced polymeric inner shafts (58) with respective said outer sleeves (60) mounted thereto.

* * * * *